United States Patent [19]
Yeager et al.

[11] Patent Number: 5,758,112
[45] Date of Patent: May 26, 1998

[54] PIPELINE PROCESSOR WITH ENHANCED METHOD AND APPARATUS FOR RESTORING REGISTER-RENAMING INFORMATION IN THE EVENT OF A BRANCH MISPREDICTION

[75] Inventors: Kenneth C. Yeager, Sunnyvale; Mazin S. Khurshid, San Jose, both of Calif.

[73] Assignee: Silicon Graphics, Inc., Mt. View, Calif.

[21] Appl. No.: 796,142

[22] Filed: Feb. 7, 1997

Related U.S. Application Data

[63] Continuation of Ser. No. 324,127, Oct. 14, 1994, abandoned.
[51] Int. Cl.[6] ........................................................ G06F 9/42
[52] U.S. Cl. .................................................................. 395/393
[58] Field of Search ....................... 364/DIG. 1 MS File, 364/DIG. 2 MS File; 395/670, 707, 376, 380, 381, 384, 390, 392, 393, 800.01, 800.03, 800.23, 800.32, 800.41

[56] References Cited

U.S. PATENT DOCUMENTS 5,134,561  7/1992  Liptay ........................................ 395/491

OTHER PUBLICATIONS

Cocke, et al., "The Evolution Of RISC Technology At IBM," IBM J. Res. Develop., vol. 34 No. 1, pp. 4–36(Jan., 1990.).

Primary Examiner—Robert B. Harrell
Attorney, Agent, or Firm—Townsend and Townsend and Crew LLP

[57] ABSTRACT

Redundant mapping tables for use in processors that rename registers and perform branch prediction is presented. The redundant mapping tables include a plurality of primary RAM cells coupled to a plurality of redundant RAM cells. In the event of a branch instruction, the redundant RAM cells can save the contents of the primary RAM cells in a single clock cycle before the processor decodes and executes subsequent instructions along a predicted branch path. Should the branch instruction be mispredicted, the redundant cells can restore the primary RAM cells in a single clock cycle. A branch stack, coupled to the redundant mapping tables, updates restored mapping tables with changes made for preceding instructions that were decoded in parallel with the branch instruction. A plurality of levels of redundant RAM cells may be used to enable the nesting of a plurality of branch predictions at any one time.

13 Claims, 10 Drawing Sheets

Microfiche Appendix Included
(1 Microfiche, 13 Pages)

PIPELINE PROCESSOR WITH ENHANCED METHOD AND APPARATUS FOR RESTORING REGISTER-RENAMING INFORMATION IN THE EVENT OF A BRANCH MISPREDICTION

This is a Continuation of application Ser. No. 08/324,127, filed Oct. 14, 1994, now abandoned, the disclosure of which is incorporated by reference.

MICROFICHE APPENDIX

A microfiche appendix containing one sheet and thirteen frames is included as an Appendix to this application and is hereby incorporated by reference in its entirety for all purposes. The microfiche appendix is directed to Chapter 5 of the design notes describing the R10000 processor.

A preferred embodiment of the present invention is incorporated in a superscalar processor identified as "R10000", which was developed by Silicon Graphics, Inc., of Mountain View, Calif.

BACKGROUND OF THE INVENTION

This invention relates in general to computers capable of performing register renaming and branch prediction and, in particular, to a computer capable of restoring register-renaming hardware to a pre-branch state in a single clock cycle in the event of a misprediction.

From the perspective of a programmer, instructions in a conventional processor are executed sequentially. When an instruction loads a new value into its destination register, that new value is immediately available for use by subsequent instructions. This is not true, however, for pipelined computer hardware because some results are not available for many clock cycles. Sequencing becomes more complicated in a superscalar processor, which has multiple execution pipelines running in parallel. But the hardware must behave as if each instruction were completed sequentially.

Each instruction depends on previous instructions which produced its operands, because it cannot begin execution until those operands become valid. These dependencies determine the order in which instructions can be executed. The actual execution order depends on the organization of the processor. In a typical pipelined processor, instructions are executed only in program order. The next sequential instruction may begin execution during the next cycle provided all its operands are valid. Otherwise, the pipeline stalls until the operands become valid. Because instructions execute in order, stalls usually delay all subsequent instructions. A sophisticated compiler can improve performance by re-arranging instructions to reduce the frequency of these stall cycles. In an in-order superscalar processor, several consecutive instructions may begin execution simultaneously, if all their operands are valid, but the processor stalls at any instruction whose operands are still busy. In an out-of-order superscalar processor, each instruction is eligible to begin execution as soon as its operands become valid, independently of the original instruction sequence. In effect, the hardware re-arranges instructions to keep its execution units busy. This process is called "dynamic issuing."

Dynamic issue and execution of pipelined instructions creates a special need to monitor and resolve data dependencies between instructions. A newly-issued instruction is dependent on a previous instruction if, for example, the newly-issued instruction must use an output of the previous instruction as an operand. A technique called "register renaming" is used to resolve data dependencies which may affect the dynamic issue and execution of instructions. To ensure each instruction is given the correct operand values, logical register numbers (or "names") used in an instruction are mapped to physical registers maintained in hardware. Each time a new value is put in a logical register, it is assigned to a new physical register. Thus, although logical registers may have successive values simultaneously within a pipeline, a physical register has only a single value.

Although one or more instructions may begin execution during each cycle in a superscalar processor, each instruction takes several or many cycles to complete. Thus, when a branch instruction is decoded, its branch condition may not yet be known. However, through such well-known techniques as "branch prediction" and "speculative execution," a processor can predict whether the branch is taken, and then continue decoding and executing subsequent instructions along the predicted path. When this prediction is wrong, the processor must back up to the branch and take the other path. Whenever the processor discovers that it mispredicted a branch, it aborts all speculatively executed instructions to restore the processor to its state before the branch.

Restoration to a pre-branch state is a time consuming process, particularly when a number of instructions pending in the pipeline reference "renamed" registers. To restore these registers, typical superscalar pipeline processors sequentially "unname" each logical register in reverse order. This operation typically requires multiple clock cycles to complete. Such time consuming operation can significantly affect the overall performance of a processor since branch instructions—and therefore branch predictions—are frequently encountered during the course of operation.

There is, therefore, a need for quickly returning a processor to a pre-branch state in the event of a branch misprediction when the processor employs register renaming.

SUMMARY OF THE INVENTION

The present invention offers a highly efficient mechanism for saving and restoring register-renaming information to facilitate branch prediction and speculative execution. This mechanism enables the contents of register renaming mapping tables (i.e., memories used to rename logical register numbers to physical register numbers) to be saved and restored in a single clock cycle.

In one embodiment, the present invention provides a register-renaming mapping table having a plurality of primary RAM cells. A plurality of redundant RAM cells are coupled to these primary cells and capable of saving and restoring the contents of the primary RAM cells in a single clock cycle. The primary RAM cells are saved in response to a branch instruction and restored when a branch misprediction occurs. A branch stack, coupled to the register-renaming mapping table, updates a restored table with changes made for preceding instructions that were decoded simultaneously with the branch instruction. Multiple levels of redundant RAM cells may be employed to save multiple versions of the contents of the primary RAM cells.

A better understanding of the nature and advantages of the present invention may be had with reference to the detailed description and the drawings below.

DESCRIPTION OF THE PREFERRED EMBODIMENT

Contents

I. Superscalar Processor Architecture
   A. Superscalar Processor Overview
   B. Operation
II. Register Operation
   A. Register Renaming
   B. Register Mapping Tables
      1. Redundant Mapping Tables
      2. Mapping Table Initialization
      3. Free Lists
      4. Register Dependency
      5. Register Map Timing
      6. Active List
III. Branch Unit

I. SUPERSCALAR PROCESSOR ARCHITECTURE

Figure 1:
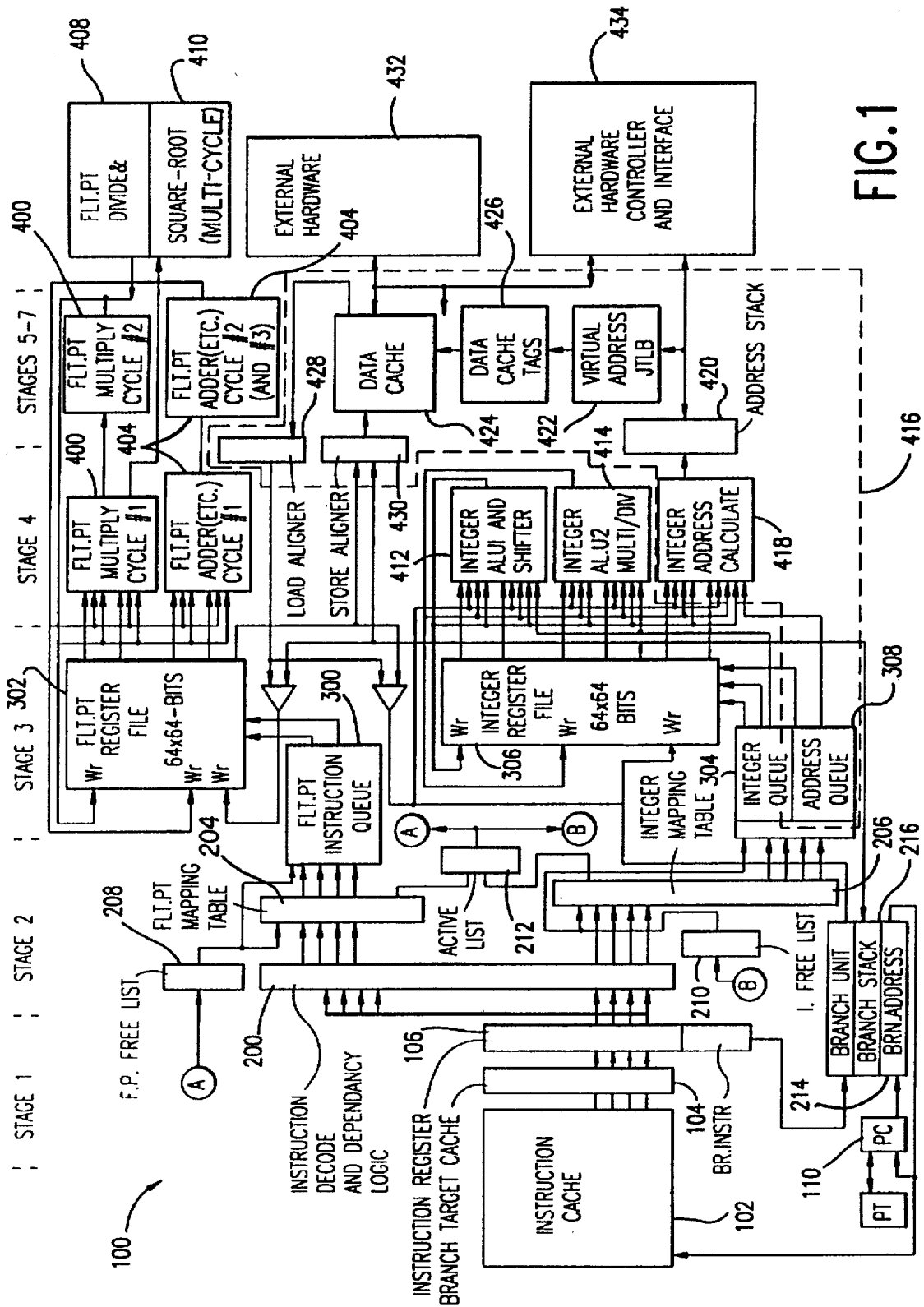
FIG. 1 discloses a functional block diagram of a superscalar processor.

FIG. 1 discloses a functional block diagram of a superscalar processor 100 which incorporates a redundant mapping mechanism built and operating in accordance with the present invention. As discussed below, this redundant mapping mechanism enables efficient recovery from branch mispredictions. Processor 100, which generally represents the R10000 Super-Scalar Processor developed by Silicon Graphics, Inc., of Mountain View, Calif., provides only one example of an application for the redundant mapping mechanism of the present invention. This processor is described in J. Heinrich, *MIPS R10000 Microprocessor User's Manual*, MIPS Technologies, Inc., (1994).

A. Superscalar Processor Overview

A superscalar processor can fetch and execute more than one instruction in parallel. Processor 100 fetches and decodes four instructions per cycle. Each decoded instruction is appended to one of three instruction queues. These queues can issue one new instruction per cycle to each of five execution pipelines.

The block diagram of FIG. 1 is arranged to show the stages of an instruction pipeline and illustrates functional interconnectivity between various processor elements. Generally, instruction fetch and decode are carried out in stages 1 and 2; instructions are issued from various queues in stage 3; and instruction execution is performed in stages 4–7.

Referring to FIG. 1, a primary instruction cache 102 reads four consecutive instructions per cycle, beginning on any word boundary within a cache block. A branch target cache 104, instruction register 106 and instruction decode and dependency logic 200, convey portions of issued instructions to floating point mapping table 204 (32 word by 6 bit RAM) or integer mapping table 206 (33 word by 6 bit RAM). These tables carry out a "register renaming" operation, described in detail below, which renames logical registers identified in an instruction with a physical register location for holding values during instruction execution. A redundant mapping mechanism is built into these tables in accordance with the present invention to facilitate efficient recovery from branch mispredictions. Mapping tables 204 and 206 also receive input from a floating point free list 208 (32 word by 6 bit RAM) and an integer free list 210 (32 word by 6 bit RAM), respectively. Output of both mapping tables is fed to active list 212 which, in turn, feeds the inputs of free lists 208 and 210.

A branch unit 214 also receives information from instruction register 106, as shown in FIG. 1. This unit processes no more than one branch per cycle. The branch unit includes a branch stack 216 which contains one entry for each conditional branch. As discussed below, processor 100 can execute a conditional branch speculatively by predicting the most likely path and decoding instructions along that path. The prediction is verified when the condition becomes known. If the correct path was taken, processing continues along that path. Otherwise, the decision must be reversed, all speculatively decoded instructions must be aborted, and the program counter and mapping hardware must be restored.

Referring again to FIG. 1, mapping tables 204 and 206 support three general pipelines, which incorporate five execution units. A floating-point pipeline is coupled to floating-point mapping table 204. The floating-point pipeline includes a sixteen-entry instruction queue 300 which communicates with a sixty-four-location floating point register file 302. Register file 302 and instruction queue 300 feed parallel multiply unit 400 and adder 404 (which performs, among other things, comparison operations to confirm floating-point branch predictions). Multiply unit 400 also provides input to a divide unit 408 and square root unit 410.

Second, an integer pipeline is coupled to integer mapping table 206. The integer pipeline includes a sixteen-entry integer instruction queue 304 which communicates with a sixty-four-location integer register file 306. Register file 306 and instruction queue 304 feed two arithmetic logic units ("ALU"); ALU#1 412 (which contains an ALU, shifter and integer branch comparator) and ALU#2 414 (which contains an ALU, integer multiplier and divider).

Third, a load/store pipeline (or load/store unit) 416 is coupled to integer mapping table 206. This pipeline includes a sixteen-entry address queue 308 which communicates with register file 306. The architecture of address queue 308 is described in detail in commonly-owned, co-pending patent application, Ser. No. 08/324,129, now abandoned, which is hereby incorporated by reference in its entirety for all purposes.

Register file 306 and address queue 308 feed integer address calculate unit 418 which, in turn, provides virtual-address entries for address stack 420. These virtual addresses are converted to physical addresses in joint translation lookaside buffer (JTLB) 422, and used to access a data cache 424 and data cache tags 426. The architecture of JTLB 422 is described in detail in commonly-owned, co-pending patent application, Ser. No. 08/324,128, which is hereby incorporated by reference in its entirety for all purposes.

Data input to and output from data cache 424 pass through store aligner 430 and load aligner 428, respectively. Data cache 424 and surrounding architecture is described in detail in commonly-owned, co-pending patent application, Ser.

No. 08/324,124, which is hereby incorporated by reference in its entirety for all purposes.

Address stack 420 and data cache 424 also communicate with external hardware controller and interface 434. Further, data cache 424 and controller/interface 434 communicate with external hardware 432.

B. Operation

Processor 100 uses multiple execution pipelines to overlap instruction execution in five functional units. As described above, these units include the two integer ALUs 412, 414, load/store unit 416, floating-point adder 404 and floating-point multiplier 400. Each associated pipeline includes stages for issuing instructions, reading register operands, executing instructions, and storing results. There are also three "iterative" units (i.e., ALU#2 414, floating-point divide unit 408 and floating-point square root unit 410) which compute more complex results.

Register files 302 and 306 must have multiple read and write ports to keep the functional units of processor 100 busy. Integer register file 306 has seven read and three write ports; floating-point register file 302 has five read and three write ports. The integer and floating-point pipelines each use two dedicated operand ports and one dedicated result port in the appropriate register file. Load/Store unit 416 uses two dedicated integer operand ports for address calculation. It must also load or store either integer or floating-point values, sharing a result port and a read port in both register files. These shared ports are also used to move data between the integer and floating-point register files.

In a pipeline, the execution of each instruction is divided into a sequence of simpler operations. Each operation is performed by a separate hardware section called a stage. Each stage passes its result to the next stage. Usually, each instruction requires only a single cycle in each stage, and each stage can begin a new instruction while previous instructions are being completed by later stages. Thus, a new instruction can often begin during every cycle.

Pipelines greatly improve the rate at which instructions can be executed. However, the efficient use of a pipeline requires that several instructions be executed in parallel. The result of each instruction is not available for several cycles after that instruction entered the pipeline. Thus, new instructions must not depend on the results of instructions which are still in the pipeline.

Processor 100 fetches and decodes instructions in their original program order, but may execute and complete these instructions out of order. Once completed, instructions are "graduated" in their original program order. Instruction fetching is carried out by reading instructions from instruction cache 102, shown in FIG. 1. Instruction decode operation includes dependency checks and register renaming (discussed below), performed by instruction decode and dependency logic 200 and mapping tables 204 or 206, respectively. The execution units identified above compute an arithmetic result from the operands of an instruction. Execution is complete when a result has been computed and stored in a temporary register identified by register file 302 or 306. Finally, graduation commits this temporary result as a new permanent value.

An instruction can graduate only after it and all previous instructions have been successfully completed. Until an instruction has graduated, it can be aborted, and all previous register and memory values can be restored to a precise state following any exception. This state is restored by "unnaming" the temporary physical registers assigned to subsequent instructions. Registers are unnamed by writing an old destination register into the associated mapping table and returning a new destination register to the free list. Renaming is done in reverse program order, in the event a logical register was used more than once. After renaming, register files 302 and 306 contain only the permanent values which were created by instructions prior to the exception. Once an instruction has graduated, however, all previous values are lost.

Active list 212 is a list of "active" instructions in program order. It records status, such as which instructions have been completed or have detected exceptions. Instructions are appended to its bottom when they are decoded. Completed instructions are removed from its top when they graduate.

II. REGISTER OPERATION

Processor 100 uses "register renaming" to manage dependencies between registers. Renaming is implemented with mapping tables 204 and 206, free lists 208 and 210, floating-point register file 302, integer register file 306, and active list 212. The free lists contain the names of all physical registers (i.e., locations in register files 302 and 306) that are currently not in use. Active list 212 contains an entry for each instruction being processed in a pipeline. Instructions are appended to the active list as they are decoded and are removed as they graduate. As noted above, active list 212 lists all pending instructions in order.

A. Register Renaming

Register renaming is a technique used to keep track of changing register values. Processor 100 generates a myriad of temporary register results as it executes instructions. These temporary values, along with permanent values, are stored in register files 302 or 306 along with permanent values. Temporary values become new permanent values when the corresponding instructions graduate. Renaming identifies where the current (temporary or permanent) value of each register is in the register file.

Renaming distinguishes between logical registers, which are referenced within instruction fields, and physical registers, which are locations in the hardware register files. The programmer is aware of only the logical registers; the implementation of physical registers is entirely hidden. Only physical registers are actually implemented in hardware. Logical register numbers are dynamically mapped into physical register numbers. This mapping is implemented using mapping tables 204 and 206, as shown in FIG. 1, which are updated after each instruction is decoded. Each new result is written into a new physical register. Its value is temporary; the previous contents of each logical register can be restored, in case its instruction must be aborted following an exception or a mispredicted branch. In the event of an exception, active list 212 is used to restore logical register contents. Alternatively, in the event of a mispredicted branch, redundant mapping tables as described below are used to restore the pre-branch state of logical registers.

Renaming simplifies dependency checks. Logical register numbers can be ambiguous when instructions are executed out of order because the same logical register may be repeatedly loaded with different values if it is specified by several instructions that are simultaneously in the pipeline. Because physical register numbers uniquely identify each result, dependency checking is unambiguous. The queues and execution units use physical register numbers. In accordance with FIG. 1, integer and floating point registers are implemented with separate renaming maps 204, 206 and multi-port register files 302, 306.

Instructions are executed "dynamically" after resolving all dependencies on previous instructions; i.e., each instruction can begin operation as soon as all its operands are available. As such, an instruction need not wait until every previous instruction has been executed. A busy-bit table (not shown) keeps track of which physical registers are busy (i.e., not available). Each register is initially busy when it is assigned from the associated free list; it becomes not busy when a result is stored.

If the physical register number of an operand is not available when the instruction is decoded, that instruction must wait in a queue. The register number of the operand is compared to the destination register number of each instruction that is completed. When it matches, the operand becomes available. Because physical register numbers are uniquely assigned to each instruction, this match can occur only for the instruction which generated the required result. With a few exceptions, integer queue 304 and address queue 308 have integer operand registers, and floating-point queue 300 has floating-point operand registers.

Figure 2:
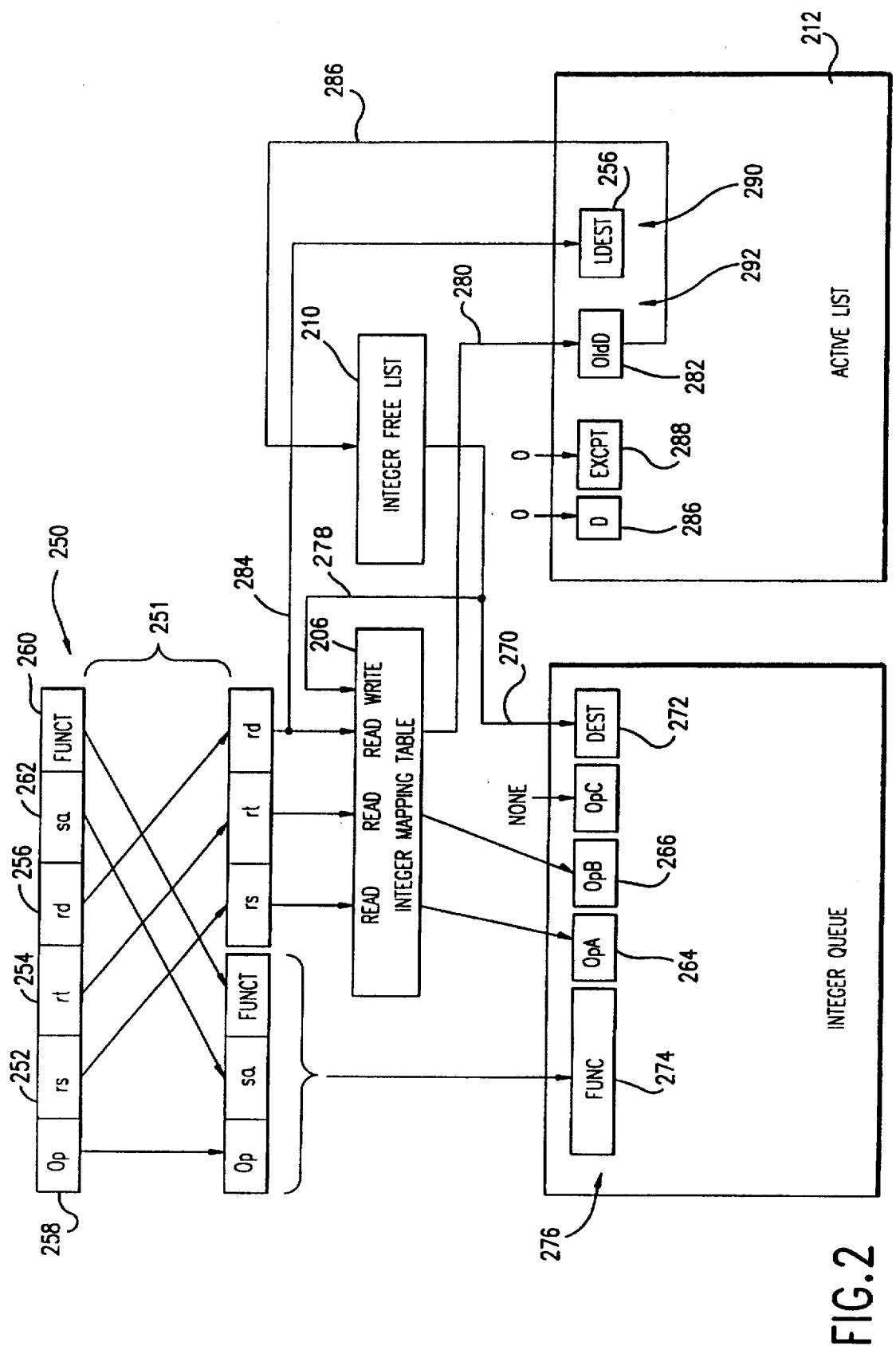
FIG. 2 illustrates a register mapping example.

FIG. 2 illustrates the mapping of a simple integer ALU instruction such as an ADD. ADD instruction 250 is configured in a preliminary format while being held in a main memory. The instruction fields are rearranged prior to being stored in instruction cache 102 through a "predecode" operation 251. Logical registers in processor 100 are usually selected using five-bit numbers 252 (rs), 254 (rt) and 256 (rd), shown in FIG. 2. The hardware stores copies of these registers in "physical registers" held in register files 302 and/or 306, shown in FIG. 1. Each physical register is identified by a six-bit physical number in the appropriate register file. The existence of these physical registers, and the mapping of logical registers to physical registers, are invisible to the programmer.

In addition to logical register numbers, instruction 250 contains function-related fields 258 (opcode), 260 (function), and 262 (subfunction).

Logical operand register numbers 252 and 254 are mapped directly to physical register numbers held in mapping table 206, resulting in physical operand register numbers 264 (OpA) and 266 (OpB). (Physical operand register number 268 (OpC) is used only in floating-point operations.) Conversely, logical destination register number 256 is mapped to a physical destination register number held in integer free list 210, as shown by line 270, resulting in a physical register number 272 (Dest).

In addition, function-related fields 258, 260 and 262 undergo a further predecode operation that groups these fields into a single function field 274. This function field and the foregoing physical numbers are gathered in a single mapped instruction 276, which is placed in integer queue 304 to await its turn for execution.

In addition to mapping logical destination register number 256, free list 210 forwards physical register number 272 to mapping table 206, as shown by line 278, thereby updating the table. As such, mapping table 206 reflects the latest mapping of logical destination register number 256. The old physical destination 282 associated with logical number 256 is output from mapping table 206 and appended to active list 212, as shown by line 280. Logical address 256 is also appended to active list 212, as shown by line 284. These two values, along with done bit 286 and exception field 288, form the latest entry in active list 212, which functions as a first-in-first-out ("FIFO") list. Old physical destination 282 will ultimately be returned to free list 210, as indicated by line 286, when instruction 276 graduates.

Clearly, there are more physical than logical registers since physical registers also store tentative results for instructions which have completed but have not yet graduated. A logical register may have a sequence of values as instructions flow through the pipeline. Whenever an instruction modifies a register, a new physical register is assigned to the logical destination register. These assignments are stored in register mapping tables 204 and 206. As each instruction is decoded, each of its logical register fields is replaced with the corresponding physical register number.

Each physical register is written exactly once. After it is output from a free list and until it is written with a result from a corresponding instruction, the physical register is "busy". If a subsequent instruction needs the values of this physical register, such instruction must wait until the register is written. After being written, the register is "ready", and its value is never changed. When a subsequent instruction changes the corresponding logical register, the result will be written into a new physical register. When this subsequent instruction graduates, the old value is no longer needed, and the old physical register becomes "free" for re-use. Thus, physical registers have unambiguous values.

Integer and floating-point registers are stored in separate register files and are renamed independently. Processor 100 contains 33 logical and 64 physical integer registers. (The extra logical register is the result of predefined register numbers associated with certain arithmetic operations.) Processor 100 also contains 32 logical and 64 physical floating-point registers.

B. Register Mapping Tables

As shown in FIG. 1, processor 100 includes two register mapping tables; integer mapping table 206 and floating-point mapping table 204. In this processor, each table maps a five-bit logical register number into a corresponding six-bit physical register number. The integer table requires 33 six-bit entries, or 198 bits total. The floating-point table requires 32 six-bit entries, or 192 bits total.

Figure 3:
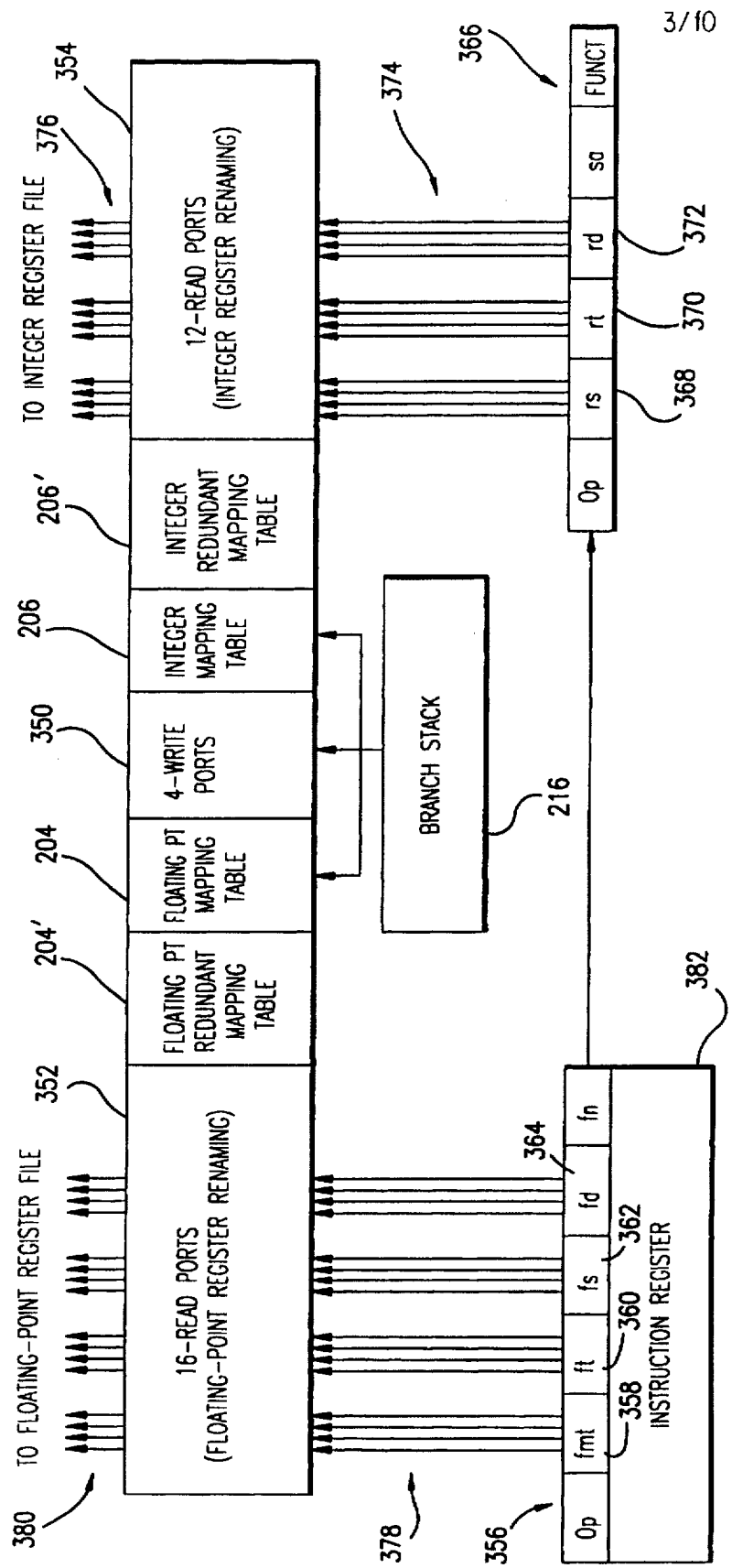
FIG. 3 discloses a block diagram of primary and redundant mapping tables constructed according to the principles of the invention.

Referring to FIG. 3, four write ports 350 are used to rename physical destination registers of the four instructions being simultaneously decoded (i.e., a total of four values being output from integer free list 208 and/or floating-point free list 210, as shown in FIG. 1). The same ports are used for both mapping tables 204 and 206, because an instruction may have either an integer or a floating result. Write ports 350 are also used by branch stack 216 to "update" mapping tables 204 and/or 206 when these tables are restored from redundant mapping tables 204' and 206'. The need for this updating operation is described below. If a six-bit word is written by any write port during the update operation, it is not restored from a redundant mapping table.

Integer mapping table 206 has twelve read ports 354, as shown in FIG. 3, which map three logical register numbers (i.e., operands 368 and 370 and destination 372) for each integer instruction 366 (up to a maximum of four instructions in parallel). Each line 374 represents a five-bit logical register number (maximum of twelve lines for four instructions) and each line 376 represents a six-bit physical register number.

Floating-point mapping table 204 has sixteen read ports 352, as shown in FIG. 3, which map four logical register numbers (i.e., operands 358, 360 and 362, and destination 364) for each floating-point instruction 356 (up to a maximum of four instructions in parallel). Each line 378 represents a five-bit logical register number (maximum of sixteen lines for four instructions) and each line 380 represents a six-bit physical register number. Instruction register 382 provides a total of four instructions (i.e., floating-point and/or integer) to the foregoing read ports during each cycle. As discussed below, each mapping table includes a number of mapping table cells (primary and redundant) and read and write decoders.

1. Redundant Mapping Tables

Each mapping table includes a redundant map containing four entries. Whenever a branch instruction is executed tentatively, integer mapping table 206 and floating-point mapping table 204 are copied in parallel into a selected redundant entry. This copy is retained in case the branch was mispredicted. When a mispredicted branch is undone, the original contents of the mapping tables are restored from the corresponding redundant entry. Referring to FIG. 3, floating-point redundant mapping table 204' contains four 192-bit entries (6 bits each for 32 registers). Integer redundant mapping table 206' contains four 198-bit entries (6 bits each for 33 registers). Each bit entry is held by a conventional RAM cell, described below. Although shown as separate units in FIG. 3 for purposes of discussion, mapping table 204 (206) and redundant mapping table 204' (206') are embodied in a single mapping table in the preferred embodiment. Accordingly, a "single" mapping table cell 700, as discussed below and shown in FIG. 4, includes a primary portion 500 (corresponding to tables 204 or 206) and redundant portion 600 (corresponding to tables 204' or 206').

Each redundant entry is a copy of a mapping table at the beginning of the decode cycle (i.e., stage 2) for the predicted branch instruction. Because processor 100 decodes up to four instructions in parallel, a redundant copy does not correspond exactly to the state of the mapping table after the branch instruction. The table must be updated with changes made for preceding instructions that were decoded during the same cycle. Branch stack 216 retains this information and updates the appropriate mapping table(s), as shown in FIG. 3, when redundant mapping tables are restored. The contents of branch stack 216 is discussed below.

Figure 4:
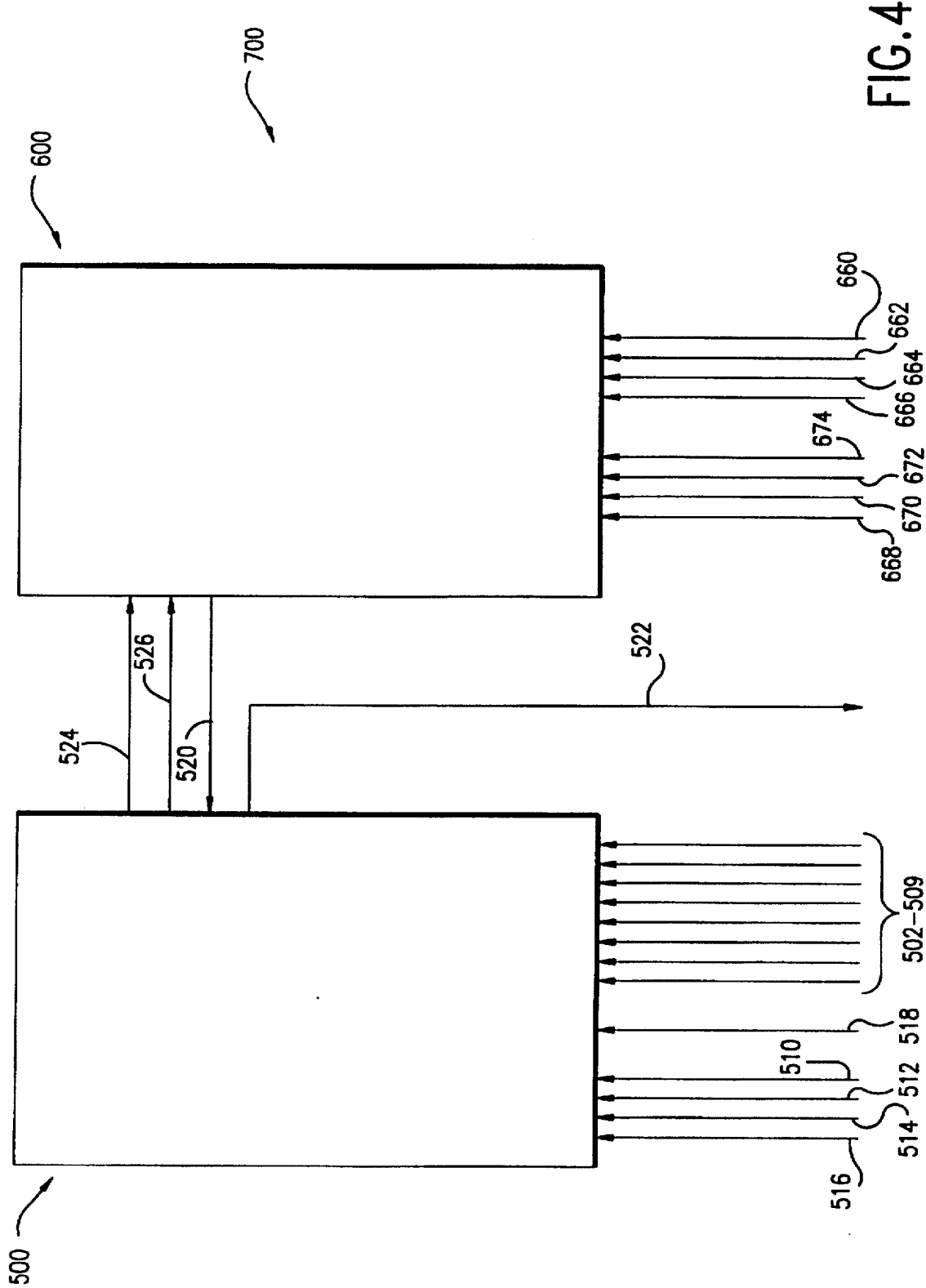
FIG. 4 discloses a single mapping table cell constructed according to the principles of the invention.

FIG. 4 illustrates single mapping table cell 700 of mapping tables 204, 204' and 206, 206'. As shown in this figure, cell 700 includes a primary bit cell 500 coupled to redundant bit cell 600 through interconnections 520, 524 and 526. This circuit includes a number of externally coupled data lines 502–509 and 522 and control lines 510, 512, 514, 516, 518, 660, 662, 664, 666, 668, 670, 672, and 674, which are discussed in greater detail in connection with FIGS. 5 and 6.

Figure 5:
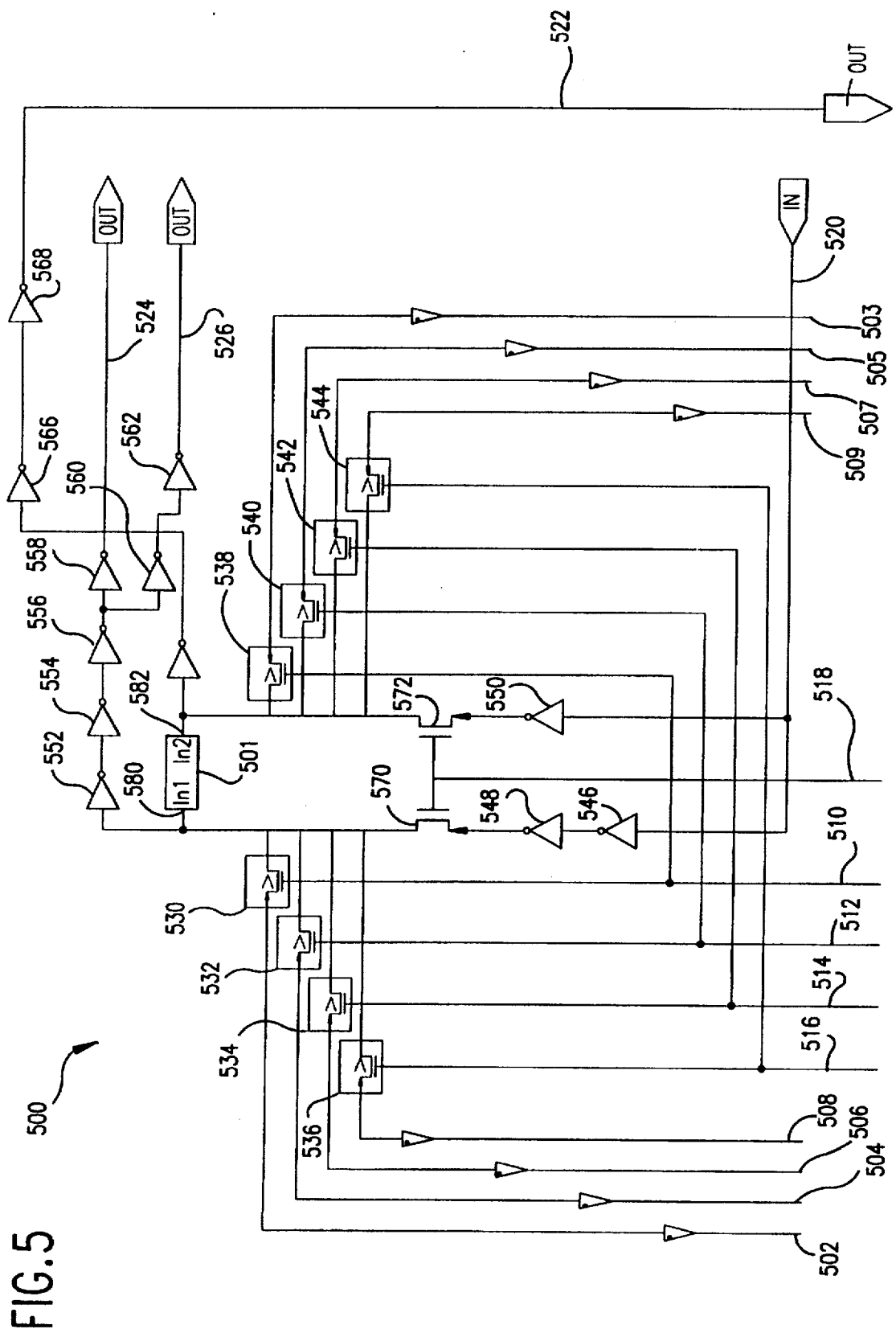
FIG. 5 discloses a primary bit cell constructed according to the principles of the invention.

Referring to FIG. 5, primary bit cell 500 includes a primary RAM cell 501 coupled to a communication network facilitating writing and reading operations. This network includes data input lines 502, 504, 506 and 508 coupled to input-output ("I/O") port 580 of cell 501 through transistors 530, 532, 534 and 536, respectively. Similarly, data input lines 503, 505, 507 and 509 are coupled to I/O port 582 of cell 501 through transistors 538, 540, 542 and 544. Lines 503, 505, 507 and 509 convey complemented values of signals conveyed on lines 502, 504, 506 and 508, respectively. Control signals 510, 512, 514 and 516 are coupled to the gates of transistors 530/538, 532/540, 534/542, and 536/544, respectively.

As further shown in FIG. 5, data input line 520 is also coupled to I/O ports 580 and 582 of cell 501. Specifically, line 520 is coupled to serially disposed inverters 546 and 548 which are, in turn, coupled to I/O port 580 through transistor 570. Additionally, line 520 is coupled to inverter 550 which is, in turn, coupled to I/O port 582 through transistor 572. Control line 518 is coupled to the gates of transistors 570 and 572.

I/O port 580 is also coupled to output lines 524 and 526 through inverters 552, 554, 556, 558, 560 and 562, as shown in FIG. 5. Similarly, I/O port 582 is coupled to output line 522 through inverters 564, 566 and 568.

As discussed above, processor 100 decodes up to four instructions per cycle. Any one of these four instructions may access cell 501 to identify a destination register using data retrieved from a free list, as described above. Lines 502, 504, 506 and 508 each can convey a single bit of data that is a portion of a destination register number associated with an instruction currently undergoing mapping operations. At the same time, lines 503, 505, 507 and 509 convey complemented values of lines 502, 504, 506 and 508, respectively, to enable writing of cell 501. If four instructions are being mapped, all eight lines will be active. Control signals 510, 512, 514 and 516—derived from logical destination register numbers held in instructions being mapped—determine which data line will write to cell 501.

Figure 7:
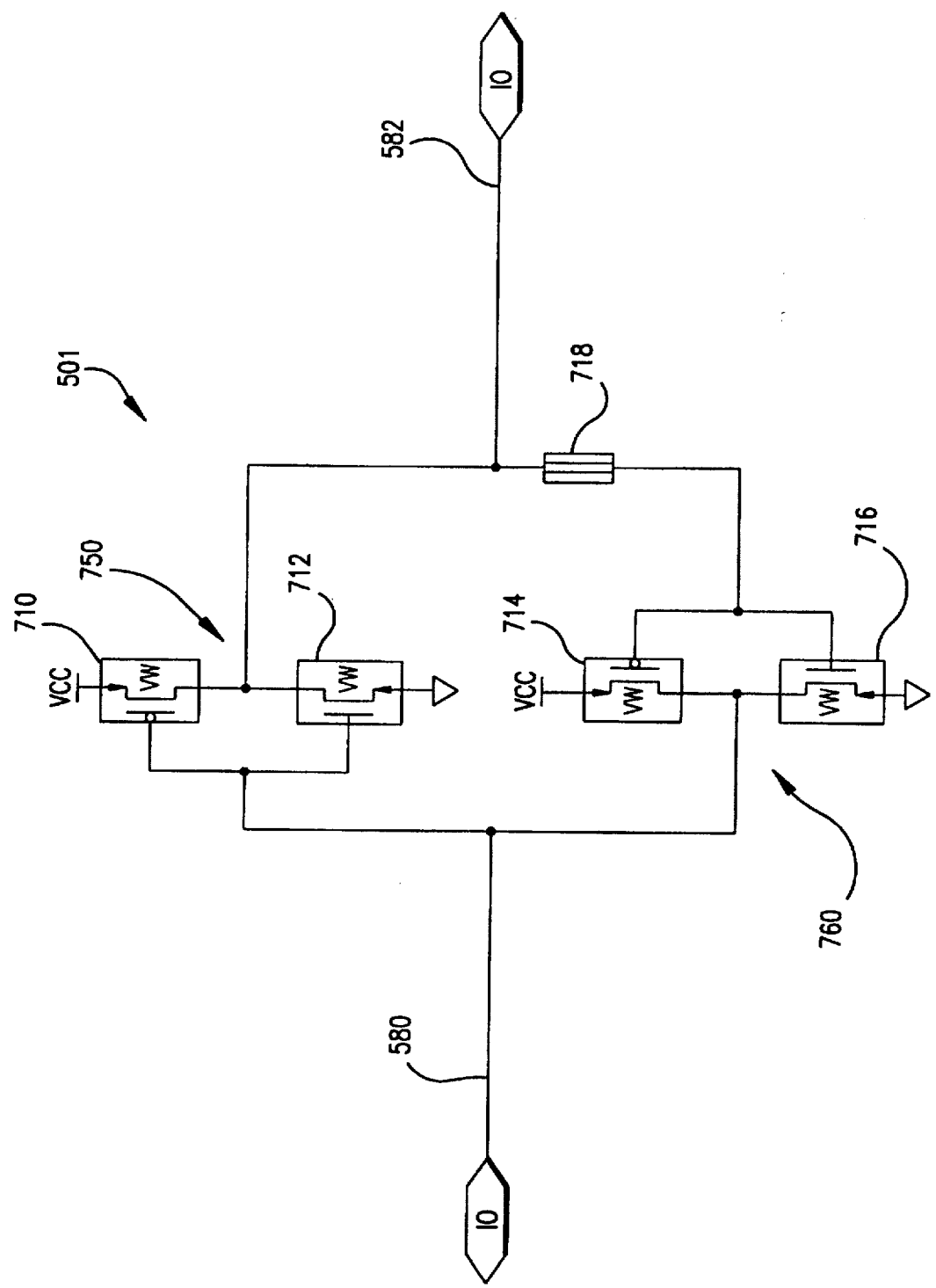
FIG. 7 discloses a conventional RAM cell.

FIG. 7 details the structure of primary RAM cell 501, which includes two conventional CMOS inverters 750 and 760. Inverter 750 is constructed from transistor 710 coupled in series to transistor 712. The source of transistor 710 is coupled to VCC while the source of transistor 712 is coupled to ground. The drain of transistor 710 is coupled to I/O port 582 and delay circuit 718 which is, in turn, coupled to the gates of transistors 714 and 716. The source of transistor 714 is coupled to VCC and the drain is coupled to transistor 716, the gates of transistors 710 and 712, and I/O port 580. The source of transistor 716 is coupled to ground.

As is well known in the art, a low (high) signal applied to I/O port 580 and high (low) signal applied to I/O port 582 will result in a steady state wherein I/O port 580 is maintained at a low (high) level and I/O port 582 is maintained at a high (low) level. Hence, data lines 502–509 convey noncomplemented and complemented signals to cell 501 when writing a new state, as shown in FIG. 5.

Control lines 510, 512, 514 and 516 determine which signal will be allowed to pass to cell 501. In terms of an entire mapping table, these control lines identify which cells, if any, will be altered by up to four instructions currently undergoing mapping operations. As noted above, these signals are derived from logical destination register numbers held in instructions being mapped.

Figure 6:
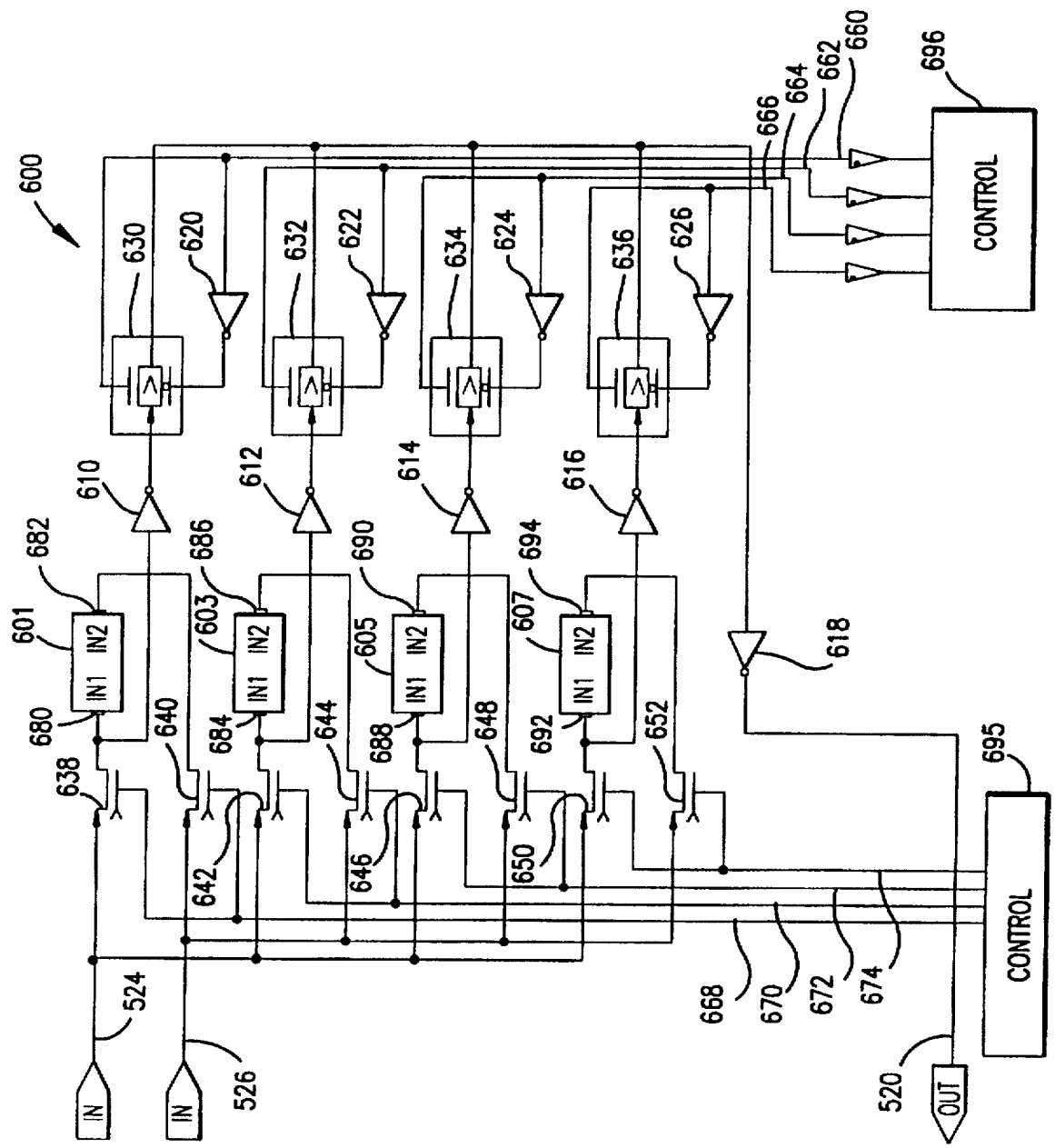
FIG. 6 discloses a redundant bit cell constructed according to the principles of the invention.

In addition to being altered by instructions undergoing mapping operations, cell 501 may also be written with data from redundant bit cell 600 through data line 520, as shown in FIGS. 5 and 6. Control line 518 enables the passage of data on line 520 to I/O ports 580 and 582 of cell 501. This line is controlled by branch unit 214, which maintains a record of currently active branch operations and controls mapping table restoration.

Cell 501 may output data to other portions of processor 100 over line 522, or to redundant bit cell 600 over lines 524 and 526, as shown in FIG. 5.

FIG. 6 shows redundant bit cell 600, which includes redundant RAM cells 601, 603, 605 and 607 coupled to data input lines 524 and 526 through a number of transistors. (The structure of redundant RAM cells 601, 603, 605 and 607 is the same as primary RAM cell 501.) Specifically, control line 668 is coupled to the gates of transistors 638 and 640. Transistor 638 couples data line 524 to I/O port 680 of redundant RAM cell 601 while transistor 640 couples data line 526 to I/O port 682 of the same redundant RAM cell. As shown in FIG. 6, an identical configuration exists between control lines 670, 672 and 674 and redundant RAM cells 603, 605 and 607, respectively. Control lines 668, 670, 672 and 674 are coupled to control logic 695, which generates necessary control signals to identify which redundant RAM cell is to be written.

Logic 695 is part of branch unit 214, which can identify those redundant cells currently in use through information contained in branch stack 216 (i.e., this logic identifies available redundant RAM cells). The branch unit creates a branch mask of 4 bits; each set bit (i.e., logic 1) indicating that a particular redundant RAM cell is in use and each cleared bit indicating that a particular redundant RAM cell is available. The branch stack, as discussed below, contains one entry for each branch that is tentative. Each entry contains the necessary information to confirm the initial branch decision and to reverse the branch if that decision was guessed incorrectly. The stack has four entries, so speculative branches can be nested four deep. Accordingly, logic 695 selects the next available redundant RAM cell (from the choice of four) based on information contained in branch stack 216.

I/O port 680 of redundant RAM cell 601 is also coupled to inverter 610 which is, in turn, coupled to transistor 630. Transistor 630 is controlled by control line 660 which is coupled directly to the non-inverted gate of transistor 630 and indirectly to the inverted gate of this transistor through inverter 620. The output of transistor 630 is coupled to data output line 520 through inverter 618. As shown in FIG. 6, an identical configuration exists between control lines 662, 664 and 666 and redundant RAM cells 603, 605 and 607, respectively. Control lines 660, 662, 664 and 666 are coupled to control logic 696, which generates necessary control signals to identify which redundant RAM cell is to be read. Again, this logic is part of branch unit 214, which generates signals based on information contained in branch stack 216 (i.e., branch mask) and the result of a branch verification operation, described below.

Referring to FIG. 3, current mapping tables 204 and 206 are stored in redundant tables 204' and 206' during branch instruction decoding. More specifically, at the beginning of a decode cycle for a predicted branch instruction (i.e., during pipeline stage 2), branch control logic 695 (FIG. 6) enables one of four control lines 668, 670, 672 or 674, thereby selecting one of four redundant RAM cells 601, 603, 605 or 607 to store a primary RAM cell 501. The value of primary RAM cell 501 is conveyed to redundant bit cell 600 via lines 524 (noncomplemented value) and 526 (complemented value). This operation is carried out in parallel during a single clock cycle for 198 primary RAM cells in integer mapping table 206 and 192 primary RAM cells in floating-point mapping table 204. The presence of four redundant RAM cells 601, 603, 605 and 607 for each primary RAM cell 501 enables the nesting of up to four speculative branches at any one time.

In the event of a misprediction, one of the four redundant RAM cells is accessed to restore the mapping table. More specifically, ALU#1 412 (FIG. 1) performs a comparison operation to verify an integer branch. Similarly, floating-point adder 404 (FIG. 1) performs a comparison operation to verify a floating-point branch. If either execution unit determines a misprediction has occurred, a restore signal is forwarded to branch unit 214 which controls mapping table restoration.

More specifically, processor 100 identifies which branches will be verified one cycle before it performs the operation. Up to four branches can be verified in any single cycle. During branch verification, only one set of redundant RAM cells (i.e., all cells associated with a particular branch) may be read in a single cycle. Accordingly, the redundant RAM cells associated with the oldest branch being verified are read first (i.e., during verification).

If the oldest branch is mispredicted, primary RAM cells in mapping tables 204 and 206 are restored with the redundant RAM cells values in 204' and 206', respectively. Any subsequent branches are discarded (i.e., corresponding entries in stack 216 are deleted) since these are based on the oldest branch. Alternatively, if the oldest branch is predicted correctly, the associated entry in branch stack 216 is deleted and the redundant RAM cell values are discarded. In the following clock cycle, the set of redundant RAM cells associated with the oldest branch that has mispredicted (identified through verification operation in the previous cycle) are read and used to restore tables 204 and 206. If no mispredictions are identified, associated entries in branch stack 216 are deleted during the branch verification cycle, and the operation is complete.

Referring again to FIG. 6, branch unit control logic 696 enables one of four control lines 660, 662, 664 or 666, thereby selecting one of four redundant RAM cells 601, 603, 605 or 607 to output a recovered value to primary RAM cell 501 via line 520. Referring to FIG. 5, control line 518 (also controlled by branch unit 214) enables the recovered value to pass through transistor 570 (noncomplemented) and transistor 572 (complemented) into I/O ports 580 and 582, respectively, of primary RAM cell 501. Like the storing operation described above, restoration operation is carried out in parallel during a single clock cycle for 198 primary RAM cells in integer mapping table 206 and 192 primary RAM cells in floating-point mapping table 204.

2. Mapping Table Initialization

Mapping tables 204, 206 and free lists 208, 210 are initialized when the chip is reset, as summarized in Table 1. Each physical register number exists exactly once, either in the mapping tables or in the free lists. As the processor executes instructions, these numbers are moved from one list to the other.

TABLE 1

Mapping Tables and Free Lists Initialization

| COMPONENT | INITIALIZATION |
| --- | --- |
| Floating Point Mapping Table 204 | Logical register n is mapped to physical register n, for n= 0 . . . 31. |
| Floating Point Free List 208 | Location n selects register (n+32), for n= 0 . . . 31 |
| Integer Mapping Table 206 | Logical register n is mapped to physical register n, for n= 1 . . . 31 |
| A first special execution-unit dependent register | Mapped to physical integer register 0 |
| A second special execution-unit dependent register | Mapped to physical integer register 32 |
| Integer Free List 210 | Location n selects register (n+32), for n= 1 . . . 31 |

3. Free Lists

Free Lists 208 and 210 contain lists of the available integer and floating-point registers, respectively. A "free" register is an unused physical register which may be assigned as the destination register of a newly decoded instruction.

Figure 8:
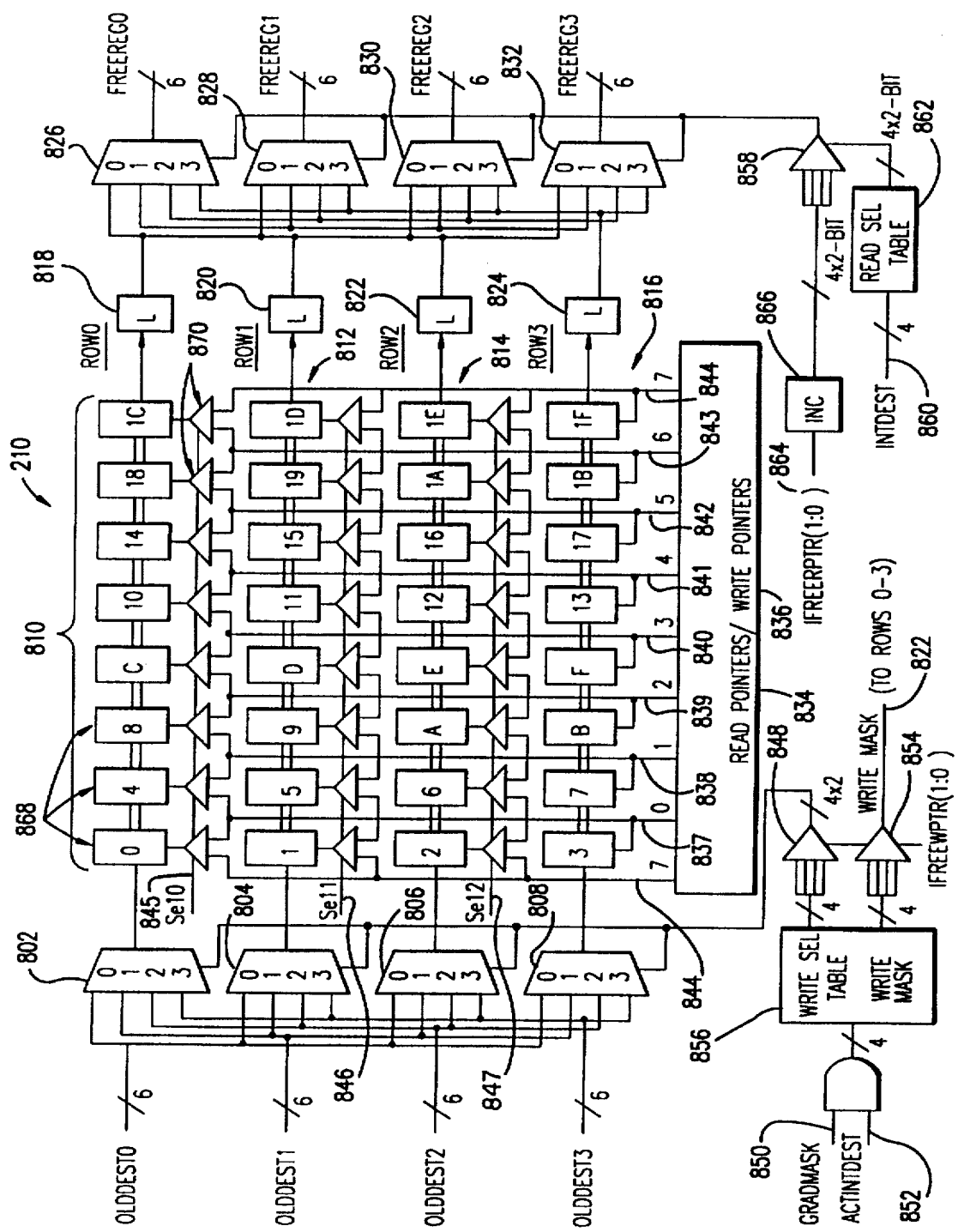
FIG. 8 discloses a block diagram of an integer free list.

Each Free List contains 32 entries. Each entry contains a 6-bit physical register number. These entries are read and written as a circular FIFO with up to four reads and four writes per cycle. To achieve this throughput, the lists have four eight-entry RAMs disposed in parallel. Referring to FIG. 8, integer free list 210 includes four-to-one input multiplexers (MUXes) 802, 804, 806 and 808 coupled to eight-entry RAMS 810, 812, 814 and 816, respectively. These MUXes direct old destination register numbers from active list 212. The outputs of these RAMs are coupled to latches 818, 820, 822 and 824 which are, in turn, coupled to output MUXes 826, 828, 830 and 832. Read pointer 834 and write pointer 836 identify entries in RAMS 810, 812, 814 and 816 via column-selection lines 837–844 (which identify entries in two columns) and row selection lines 845–847 (which select one of two identified columns for RAMS 810, 812 and 814).

Input MUXes 802, 804, 806 and 808 are coupled to four pairs of 4X1 control MUXes, represented collectively by a single control MUX 848. Control MUX 848 input is a product of graduation mask input 850, ActIntDest 852 and write select table 856 as illustrated in FIG. 8 and described in Table 2. Graduation mask 850 identifies which instructions graduate and ActIntDest 852 identifies which instructions have an integer destination. Write mask 855, output from MUX 854, identifies which row(s) (i.e., RAMs 810, 812, 814 and/or 816) is to be written. Selection control of MUXes 848 and 854 is carried out by the two least significant bits of write pointer 836; i.e., IFreeWPtr[1:0]. Table 2 assumes the next empty entry is in row 0 (i.e., IFreeWPtr[1:0]=00). The Write Select outputs of Table 2 are rotated for other pointer alignments. Mask values of "1" indicate that an entry should be written in the corresponding row.

TABLE 2

Free List Write Decoding

| Graduate Mask | Write Mask | Write Select |
|---|---|---|
| 0000 | 0000 | xxxx |
| 0001 | 1000 | 3xxx |
| 0010 | 1000 | 2xxx |
| 0011 | 1100 | 23xx |
| 0100 | 1000 | 1xxx |
| 0101 | 1100 | 13xx |
| 0110 | 1100 | 12xx |
| 0111 | 1110 | 123x |
| 1000 | 1000 | 0xxx |
| 1001 | 1100 | 03xx |
| 1010 | 1100 | 02xx |
| 1011 | 1110 | 023x |
| 1100 | 1100 | 01xx |
| 1101 | 1110 | 013x |
| 1110 | 1110 | 012x |
| 1111 | 1111 | 0123 |

Similarly, output MUXes 826, 828, 830 and 832 are coupled to four pairs of control MUXes, represented collectively by a single control MUX 858. Control MUX 858 input is a product of the two least significant bits of read pointer 864, (i.e., IFreeRPtr[1:0]) fed through incrementer 866, as shown in FIG. 8 and further described in Table 3. Selection control of MUX 858 is carried out by destination mask input 860 and read select table 862. Like Table 2, Table 3 assumes the next available entry is in row 0 (i.e., IFreeRPtr[1:0]=00). The inputs of MUX 858 are rotated for other pointer alignments.

TABLE 3

Free List Read Decoding

| IntDest Mask | Read Select |
|---|---|
| 0000 | xxxx |
| 0001 | xxx0 |
| 0010 | xx0x |
| 0011 | xx01 |
| 0100 | x0xx |
| 0101 | x0x1 |

TABLE 3-continued

Free List Read Decoding

| IntDest Mask | Read Select |
|---|---|
| 0110 | x01x |
| 0111 | x012 |
| 1000 | 0xxx |
| 1001 | 0xx1 |
| 1010 | 0x1x |
| 1011 | 0x12 |
| 1100 | 01xx |
| 1101 | 01x2 |
| 1110 | 012x |
| 1111 | 0123 |

Each RAM (i.e., 810, 812, 814 and 816) needs to have only one read and one write port, because any four consecutive entries will be spread between the four RAMs. Read pointer 834 and write pointer 836 are each 5-bit values. The high three bits are decoded to select one of eight column-selection lines 837–844. The low two bits select one entry within one of two columns via row selection lines 845, 846 and 847. This is the first entry to be read or written. The other three are in sequential order, as indicated by the numbers enclosed within each RAM entry 868 of FIG. 8. This includes any entries directly below the addressed entry and entries above in the next column. This entry selection is implemented by multiplexing between a single column-selection line via 2X1 MUXes 870 and row-selection lines 845–847 at each entry, as shown in FIG. 8.

When an instruction graduates, the "old" physical register number associated with its destination register is written back into the appropriate free list. (FIG. 8 shows integer free list 210.) This releases the physical register, so that it can be used again. To write each number into the correct RAM, each write port includes a 4-input MUX (i.e., 802, 804, 806 or 808, as shown in FIG. 8) which can select from any of the four graduating instructions. The controls for these multiplexers depend on graduation mask 850, ActIntDest 852 and the low two bits of the write pointer. The mask, which (together with signal 852) indicates which of the four graduating instructions is releasing an integer register, is decoded into four 2-bit signal pairs. The location of the leftmost destination register is written into the leftmost pair, etc. As noted above, this decoder—as represented by Table 2—assumes that low write pointer bits are zero. The decode for other values in the pointer is generated by rotating these four select signals, based on the low two bits of the write pointer. (Note that the same FIFO organization is used within the active list. The first graduating instruction may be anywhere within the four words. This circuit does not need to keep the free registers in any particular order.)

Write pointer 836 is incremented by the number of instructions which graduate during each cycle.

During each cycle, the next four free list entries are read using read pointer 834. If one or more of the instructions being mapped require an integer destination register, these entries are allocated in sequence to those instructions. The decode table—as shown in Table 3—assumes that the low pointer bits are zero. For other values, these decodes are translated using four pairs of 4-to-1 multiplexers, represented collectively by MUX 858. The input to these multiplexers is a cyclic series of 2-bit values, beginning with the low two bits of the read pointer (00-01-10-11-00 etc.). Note, unlike the write decoder, this read decoder controls the selects, not the inputs, of the control multiplexers.

Read pointer 834 is incremented by the number of free registers assigned during each cycle. These assignments may be speculative for instructions decoded after a branch instruction is predicted. When a branch is executed speculatively, the read pointer is written into its branch stack entry, described below. This pointer value is incremented by the number of instructions decoded, which will not be aborted if the branch is reversed.

4. Register Dependency

Four instructions can be decoded and renamed during each cycle. Each logical operand register in an instruction is mapped into physical register names using multiported mapping tables 204 and 206, as shown in FIGS. 1 and 3. A logical destination register is renamed with a new physical name from free list 210 (if an integer) or 208 (if a floating point). However, if the logical destination register of any instruction is used as an operand of a subsequent instruction (within these four), the new physical name of that register is used instead of the name read from the map table.

The first of the four instructions has no operand dependencies. The second instruction may depend on the first. The third instruction may depend on either of the first two. The fourth instruction may depend on any of the first three. If an operand depends on more than one previous instruction, the destination of the later instruction is used. Conventional comparator circuitry is used to determine such dependencies.

5. Register Map Timing

Figure 9A:
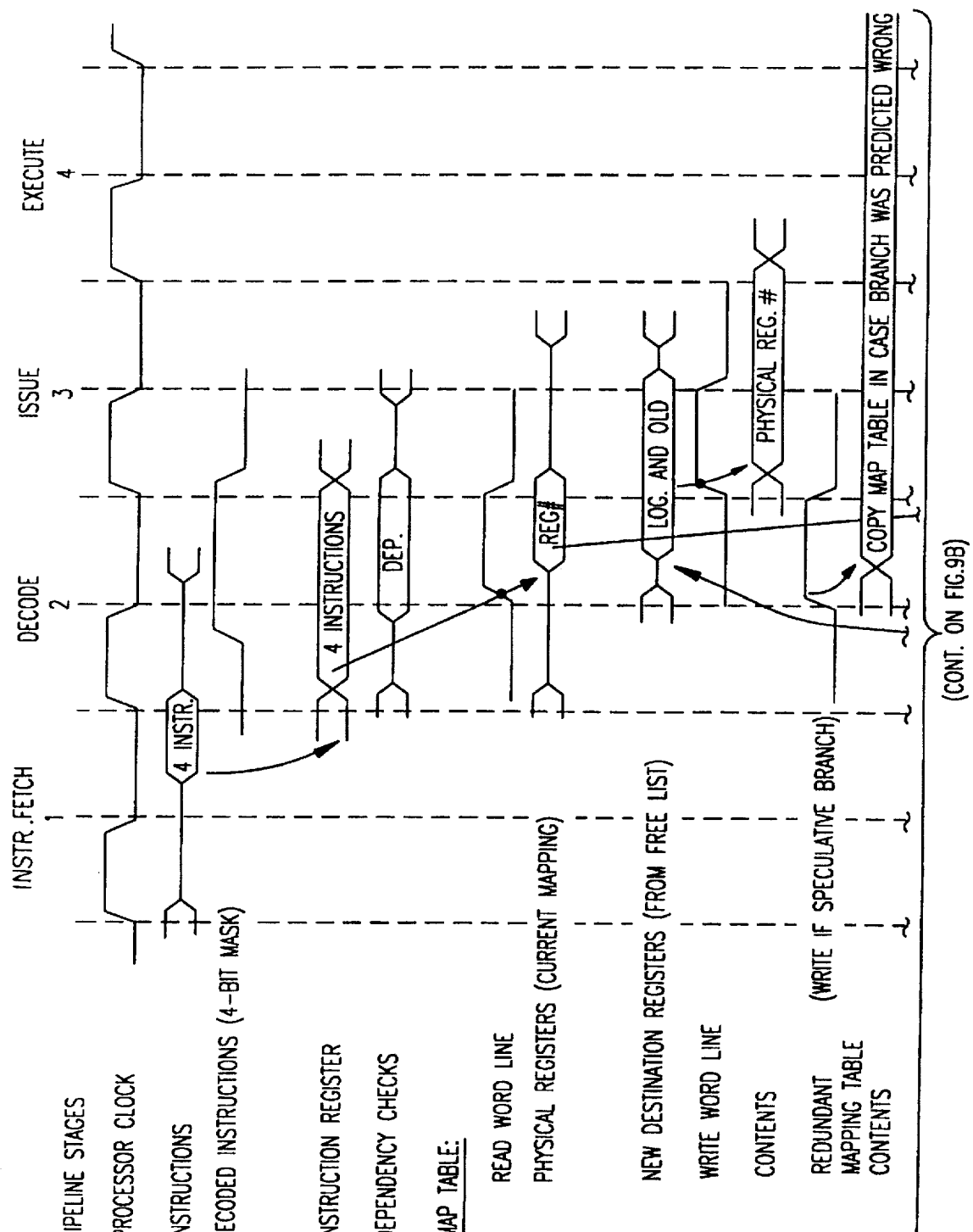
FIGS. 9A and 9B collectively are a timing chart showing register renaming timing.
Figure 9B:
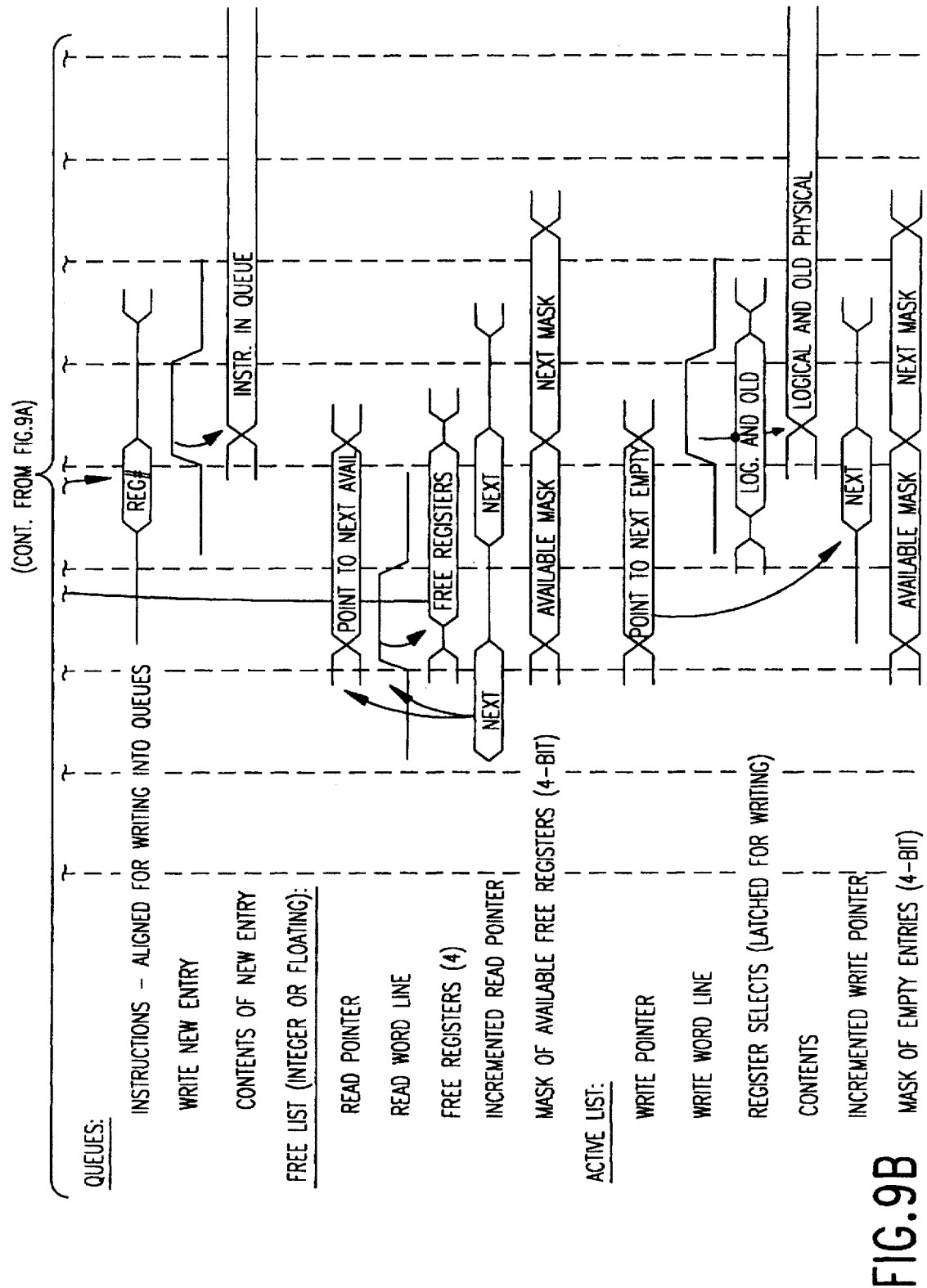

Mapping tables 204 and 206 are read during phase 2 of the decode cycle, as shown in FIG. 9. These tables are updated by branch stack 216 with new register mapping during phase 1 of the following cycle.

When a speculative branch is decoded, mapping tables 204 and 206 are copied into redundant mapping tables 204' and 206' (FIG. 3), respectively, during phase 2 of the decode cycle. If that branch was mispredicted, the mapping tables may be restored by copying the redundant mapping tables during phase 2 of a branch restore cycle, occurring during an execution stage of processor 100.

6. Active List

Active list 212 contains an ordered list of all active instructions. An instruction becomes active after it has been decoded. It remains active until it graduates (completes in program order) or is aborted by reversed branch decision or an exception.

When an instruction with an exception graduates, all subsequent instructions are flushed from the pipeline. Active list 212 is emptied in reverse order. For each instruction, the logical register is renamed to its previous physical register, and its new physical register is returned to the free list.

Active list 212 is implemented as a 32-word circular FIFO, whose structure is similar to free lists 208 and 210. Like the free lists, active list 212 consists of four eight-entry RAM memories. Four consecutive entries can be written (during decode) or read (during graduation) by accessing one entry in each memory. Write data is aligned to the proper memory using four pairs of four-to-one multiplexers. When reading, however, most of the data is not aligned at the active list. New free registers are appended to free lists 208 or 210, and the entries are aligned using the input MUXes of the free lists (i.e., MUXes 802, 804, 806 and 808 of integer free list 210, for example), as shown in FIG. 8.

Done bit 286 and exception bit 288, as shown in FIG. 2, are initialized, usually to zero, when an instruction is decoded. These bits are set when an instruction completes execution. The "done" and "exception" bits control when instructions graduate. When "done," up to four instructions can graduate per cycle, provided no previous instruction had an exception.

Instructions graduate in original program order from active list 212, after they have been completed by a functional unit. Instructions complete (i.e., become eligible for graduation) when their results have been computed and stored in a register. Because execution and completion can occur out of order, each completion is recorded by setting done bit 286 for that instruction. Address queue 308 generates "done" signals for load and store instructions. For all other instructions, an execution unit sets the done bit of an instruction in active list 212. As instructions graduate, a "graduation unit" (not shown) removes instructions from active list 212 and appends their old destination registers to free lists 208 or 210 for re-use. Up to four instructions can graduate in parallel during each cycle.

If a functional unit detects an exception, it stores an exception code for the effected instruction in active list 212 rather than setting the done bit 286 of this instruction. This instruction is aborted and will not graduate, but there is no direct effect on other instructions in the pipeline. Instruction fetch and decode is suspended.

If an exception occurs on an instruction fetched after a mispredicted branch, the instruction will remain pending until that branch is reversed. Then, that instruction is aborted and the exception is ignored.

An exception is taken only when the corresponding instruction is ready to graduate, after all previous instructions have graduated. At this point, all subsequent instructions are aborted and the mapping tables 204 and 206 are restored to their state before the excepting instruction was decoded.

On a cycle after an exception is detected, the mapping tables are sequentially restored using the logical destination field 290 and old destination field 292 in active list 212, as shown in FIG. 2. Up to four registers are restored per cycle, beginning with the latest and working backward. Because there may be up to 32 instructions in active list 212, this restoration process may require up to eight cycles.

The "new" registers, which were assigned to the now aborted instructions when they were decoded, must be returned to the appropriate free list. This is done by simply adjusting the read pointers of the two free lists, 208 and 210. It is not necessary to write into these lists because their original contents have not been overwritten. Because all instructions in the pipeline have been purged, all registers which are not in the mapping tables must be in the corresponding free list. For floating-point free list 208, there are thirty-two free registers (making the free list full). This is accomplished by resetting the read pointer to equal the write pointer. For integer free list 210, there are thirty-one free registers. The read pointer is set equal to the write pointer plus one.

III. BRANCH UNIT

Processor 100 typically addresses instructions sequentially through the use of program counter (PC) 110, shown in FIG. 1. PC is typically incremented by one word (i.e., 4 bytes) after each instruction is executed. This sequential order is modified by jump and branch instructions, which load non-sequential values into PC 110. Jump instructions are unconditional changes in sequence. Branch instructions are conditional upon a selected test. For simplicity, the term "branch" as used in this text refers to either conditional or unconditional instructions.

Referring to FIG. 1, branch unit 214 decodes and initiates branches during pipeline stage 2. The value held in PC 110 is valid for stage 2 only; it points to the first instruction being decoded. The next value of PC is computed during stage 2.

Conditional branches create delays because the condition often cannot be tested for several (or many) cycles after the branch instruction is decoded. To reduce these delays, processor 100 predicts whether the branch will be taken and proceeds to execute instructions speculatively along the predicted path. If the prediction is correct, testing the condition has little effect on performance. However, when a branch is mispredicted, processor 100 must reverse direction and abort all speculatively decoded instructions. This processor must also restore the pre-branch values held by PC 110 and register mapping tables 204 and 206, shown in FIG. 1. This is completed using branch stack 216 and redundant mapping tables 204' and 206', shown in FIGS. 1 and 3, respectively. Processor 100 can handle up to four nested speculative branches and verify them in any order.

A branch instruction may be in any of the four words in instruction register (IR) 106, shown in FIG. 1. The earliest branch instruction is selected and then decoded. Only this one branch could be decoded during this cycle. If IR 106 contains a second branch instruction, decoding it and any subsequent instructions are delayed until the next cycle.

When a branch is reversed, active list 212 and mapping tables 204 and 206, shown in FIG. 1, must be restored to the point at which the execution paths diverged. That is, each unit is restored to its state after the last instruction which is executed in both the "branch taken" and "branch not taken" cases; defined as the "restore point."

As discussed above, redundant mapping tables 204' and 206' (FIGS. 3–7) make a copy of mapping tables 204 and 206, respectively, for use if a branch is restored. Although processor 100 decodes up to four instructions in parallel, mapping tables 204 and 206, in their preferred embodiment, are not updated for each instruction individually. Rather, these tables make a copy at the beginning of the decode cycle (i.e., stage 2). Thus, the precise restore point for a particular branch instruction might not exist in redundant mapping tables 204' and 206'. As such, the changes made during the cycle are recorded separately in branch stack 216. That is, the destination registers of the four instructions decoded during the same cycle are saved in the branch stack.

If all four instructions are decoded in a single cycle, an alternative embodiment of redundant mapping tables 204' and 206' could make a new copy of mapping tables 204 and 206, respectively, during the following cycle. This embodiment would eliminate the need for saving the fourth destination register. However, this extra redundant mapping operation might coincide with a redundant mapping operation for a second branch instruction. To accommodate simultaneous redundant mapping operations, stronger drivers would be required to accommodate simultaneous writes to redundant RAM cells.

A. Speculative Branches

As noted above, conditional branches can cause significant processing delays in a pipelined processor because the tested condition is often not determined for several cycles after the branch is decoded.

In processor 100, if the direction of a branch is unknown when the branch is decoded, the direction will be predicted and instructions will continue to be decoded speculatively. Instructions are fetched only along the predicted path, but up to four predictions can be nested. A branch is recorded in branch stack 216 until the prediction can be verified. Verification may be performed out of order.

B. Branch Prediction

The prediction of conditional branches depends on a branch history circuit contained in branch unit 214. This is an n-word by two-bit RAM that tracks how often each particular branch was taken in the past. The word is selected by certain bits of the address of the branch instruction. Each entry has a two-bit code, as indicated in Table 4. The two-bit code is updated whenever a final branch decision is made. The first bit is used to predict a branch taken (1) or nor taken (0). The second bit helps decide when to change the prediction. The prediction is changed only if two contrary branch decisions occur in a row.

TABLE 4

Branch history RAM

| State | Next State Taken | Next State Not | Prediction |
|---|---|---|---|
| 00 | 01 | 00 | Not taken. Last two branches were not taken. |
| 01 | 10 | 00 | Not Taken. Previous decision was contrary ("taken"). |
| 10 | 11 | 01 | Taken. Previous decision was contrary ("not taken"). |
| 11 | 11 | 10 | Taken. Last two branches were taken. |

C. Branch Stack

Branch stack 216, identified in FIG. 1, contains an entry for each branch instruction which is being executed speculatively. It contains four entries, so up to four speculative branch decisions can be nested. An entry is created whenever a branch path is predicted. The entry is deleted when the branch decision has been verified. Entries are also deleted if any previous branch was predicted incorrectly.

Each branch stack "entry" contains the information required to restore the state of processor 100 if a speculative branch is reversed. An entry consists of several physically distinct sections (i.e., held in various locations within the processor), which are associated with various data structure whose value must be restored. Several sections of a branch stack entry are identified in Table 5.

TABLE 5

Branch stack entry

| Section | Signal | Description |
|---|---|---|
| Branch Stack | BSBrMask | Branch mask of previous speculation branches. |
| Redundant Mapping Table | ShadowN | Copy of integer mapping table 206 (33 × 6 bits). |
| | ShadowF | Copy of floating-point mapping table 204 (32 × 6 bits). |
| | ShadowUp | Shadow map updates - - update four newly decoded registers in both mapping tables. |
| Active List | BSActWPtr | Active list - write pointer. |
| Free Lists | BSFreeNRPtr | Integer free list - read pointer. |
| | BSFreeFRPtr | Floating-point free list - read pointer. |
| PC | BSAltPC | Alternate branch path address. |

The following is a brief description of the entries and terms used in Table 5.

A "branch mask" indicates if each entry is dependent on any previous speculative branch. This indicates the original program order of the branches in branch stack 216.

Redundant mapping tables 206' and 204' make a copy of integer mapping table 206 and floating-point mapping table 204 during phase 2 of stage 2, respectively (see FIG. 9). As discussed above, these redundant tables are built within primary mapping tables (a map RAM structure) so that the entire contents can be copied in parallel in a single cycle. These mapping tables are also referred to as "shadow maps."

"Shadow map updates" retain the necessary information to update redundant mapping tables to reflect any changes made for instructions decoded during the cycle when the subject branch was originally decoded. These changes are effected when a redundant mapping table is restored. Each such instruction may change one physical (integer or floating-point) register. Each register is specified with its six-bit physical number and a two-bit validity code. The code is "0" if the instruction has no destination register or if it was decoded after the "restore point." Codes "2" and "3" indicate the restored redundant mapping table must be updated for integer and floating-point destination registers, respectively.

Write pointer for active list 212 is used to append newly decoded instructions to the active list. When a speculative branch is reversed, all instructions after that branch are aborted. They are removed from active list 212 by restoring its write pointer.

Read pointers for free lists 208 and 210 are used to read the physical register numbers of the next available integer or floating-point registers. When a speculative branch is reversed, these registers are returned to the free lists by restoring their read pointers. The contents of these locations in the free lists has not been altered.

Alternate branch path address contains the next instruction address along the execution path not taken. It is reloaded into PC 110 (FIG. 1) if the branch prediction was wrong. If the branch is initially taken, the alternate address is the instruction after the "restore point," defined above. Otherwise, the alternate address is the target address of the unused branch instruction.

While the above is a complete description of the preferred embodiment of the invention, various modifications, alternatives and equivalents may be used. Therefore, the above description should not be taken as limiting the scope of the invention which is defined by the appended claims.

What is claimed is:

1. A pipeline processor comprising: means for issuing instructions containing logical register numbers;
   a renaming means, coupled to said issuing means, for renaming logical register numbers to physical register numbers;
   a storage means, coupled to said renaming means, for storing contents of said renaming means in a first clock cycle in response to a branch instruction;
   a branch prediction means, coupled to said renaming means, for predicting said branch instruction;
   a comparator means, coupled to said branch prediction means, for determining whether branch prediction is correct;
   interconnection means, disposed between said renaming means and said storing means, which enables said storing means to restore said contents of said renaming means in a single clock cycle when a branch misprediction occurs, said contents being restored to a point in time prior to decoding of said branch instruction; and
   stack means, coupled to said renaming means, for updating said renaming means with changes occurring after said point in time, said changes being caused by instructions decoded simultaneously with said branch instruction and preceding said branch instruction in original program order.

2. The pipeline processor of claim 1 further comprising a free list means, coupled to said renaming means, for providing new mapping information to said renaming means.

3. The pipeline processor of claim 2 further comprising an active list means, coupled to said renaming means, for receiving old mapping information from said first renaming means.

4. The pipeline processor of claim 3, wherein said storing means includes means for holding a plurality of versions of said contents of said renaming means associated with a plurality of branch instructions at any one time.

5. The pipeline processor of claim 4 wherein said renaming means includes a floating-point renaming means and an integer renaming means.

6. The pipeline processor of claim 5 wherein said storage means includes a first storage means coupled to said floating-point renaming means and a second storage means coupled to said integer renaming means.

7. The pipeline processor of claim 1 wherein said interconnection means includes:
   a first set of data lines over which a single value held in a primary RAM cell within said renaming means may pass to one of a plurality of redundant RAM cells within said storing means; and
   a second set of data lines over which one of a plurality of values held in said plurality of redundant RAM cells may pass to said primary RAM cell.

8. In a pipeline processor capable of renaming registers and speculatively executing instructions, a method for restoring register-renaming information in the event of a branch misprediction comprising the steps of:
   decoding a plurality of instructions in parallel during a decode cycle, wherein one of said plurality of instructions is a branch instruction;
   storing contents of a register-renaming mapping table during said decode cycle, said contents being unaffected by said plurality of instructions;
   saving physical-register information associated with at least one of said plurality of instructions separate from said contents;
   predicting said branch instruction;
   verifying said prediction;
   restoring said contents to said register-renaming mapping table in a single clock cycle when a branch misprediction occurs; and
   updating said register-renaming mapping table with said physical-register information associated with at least one of said plurality of instructions.

9. The method of claim 8 wherein said at least one of said plurality of instructions precedes said branch instruction in original program order.

10. The method of claim 9 wherein said physical register information is characterized by a two-bit validity code indicating whether said physical register information is integer or floating point.

11. A pipeline processor comprising:
   a register-renaming mapping table;
   a redundant mapping table, coupled to said register-renaming mapping table, for storing a complete copy of said register-renaming mapping table in response to a branch instruction; and
   a branch stack, coupled to said register-renaming mapping table, for storing a portion of said register-renaming mapping table, said portion being associated with an instruction decoded in parallel with said branch instruction, said instruction preceding said branch instruction in original program order.

12. The pipeline processor of claim 11 wherein:

said redundant mapping table comprises a redundant RAM cell; and said register-renaming mapping table comprises a primary RAM cell, said primary RAM cell being coupled to said redundant RAM cell through a first transistor and a second transistor, said first and second transistors being coupled to a first control line which controls access to said redundant RAM cell.

13. The pipeline processor of claim 12 further comprising:

a third transistor and a fourth transistor disposed between said redundant RAM cell and said primary RAM cell; and a second control line, coupled to said third and fourth transistors, which controls access to said primary RAM cell.

* * * * *